July 24, 1934.	C. C. FARMER	1,967,300
CHECK VALVE DEVICE
Original Filed Aug. 31, 1932

INVENTOR
CLYDE C. FARMER
BY Wm. M. Cody
ATTORNEY

Patented July 24, 1934

1,967,300

UNITED STATES PATENT OFFICE 1,967,300

CHECK VALVE DEVICE

Clyde C. Farmer, Pittsburgh, Pa., assignor to The Westinghouse Air Brake Company, Wilmerding, Pa., a corporation of Pennsylvania Original application August 31, 1932, Serial No. 631,191. Divided and this application April 26, 1933, Serial No. 668,050

3 Claims. (Cl. 277—20)

This invention relates to fluid pressure controlled valve devices and more particularly to a valve construction, the present application being a division of my pending application, Serial No. 631,191, filed August 31, 1932.

The principal object of my invention is to provide an improved valve structure.

Figure 1:
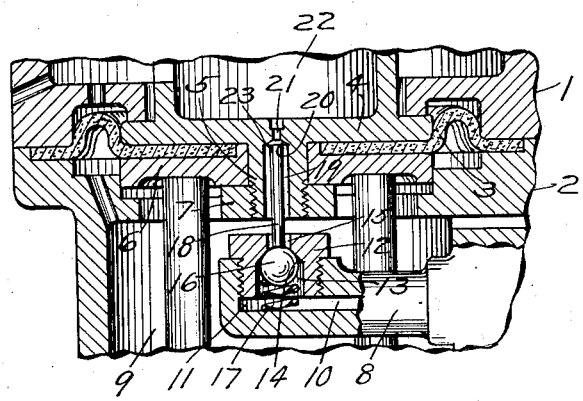
Figure 2:
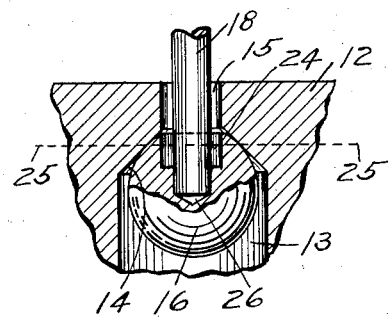

In the accompanying drawing; Fig. 1 is a diagrammatic view, mainly in section, of a portion of a fluid pressure controlled valve device embodying my improved valve structure; and Fig. 2 is an enlarged view of a portion of the device shown in Fig. 1.

As shown in the drawing, the fluid pressure controlled valve device comprises two casing sections 1 and 2, between which is clamped a flexible diaphragm 3. A diaphragm follower 4 engages one side of diaphragm 3 and is provided centrally with a stud 5 extending through a suitable aperture in said diaphragm. A follower 6 is mounted on the opposite side of said diaphragm and is provided centrally with an aperture through which the stud 5 extends. A nut 7 on the stud 5 clamps diaphragm followers 4 and 6 to the diaphragm 3.

A lug 8 projects from the casing section 2 into a chamber 9 at the lower side of diaphragm 3, said lug being provided with a fluid pressure supply passage 10 terminating at one end in a chamber 11, one end of which opens to chamber 9 substantially centrally below the stud 5.

The open end of chamber 11 is closed by a valve seat plug 12 having screw-threaded engagement with lug 8. The plug 12 is provided with a cavity 13 open to chamber 11. The inner end of the cavity 13 is tapered to form a valve seat 14 which terminates in a passage 15 opening into chamber 9. A ball check valve 16 is contained in chamber 13 and is urged into engagement with seat 14 by a spring 17 for closing communication from chamber 11 to chamber 9.

A stem 18 is carried by the ball valve 16 and loosely projects through the passage 15 and into a passage 19 provided in the stud 5. The passage 19 terminates in a valve seat 20 which is open through a passage 21 to a chamber 22. The end of the stem 18 is provided with a valve 23 adapted to be engaged by the seat 20 for closing communication from passage 19 and chamber 9 to chamber 22.

It will be evident that with the parts of the device in the position shown in Fig. 1, if the diaphragm 3 is deflected downwardly, the valve seat 20 in follower 4 will be moved into engagement with valve 23 so as to close communication from chamber 9 to chamber 22. Further deflection of diaphragm 3 in a downwardly direction will then operate through the valve stem 18 to move the ball valve 16 away from the valve seat 14, thereby opening communication from chamber 11 to chamber 9. Upon deflection of diaphragm 3 in the opposite or upwardly direction, spring 17 acts to seat the valve 16, thereby closing communication from chamber 11 to chamber 9. Upon seating of valve 16, further upward movement of valve 23 is prevented, so that the continued upward deflection of diaphragm 3 moves the valve seat 20 away from the valve 23 so as to open communication from chamber 9 to chamber 22.

According to the invention, I secure the valve stem 18 in the ball valve 16 in the manner indicated in Fig. 2. It will be noted that the ball valve 16 is provided with a counterbore 24 which extends beyond the plane 25 including the line of contact between the ball valve 16 and its seat 14. An axial bore 26 of smaller diameter than that of the counterbore 24 opens into the bottom thereof, and the valve stem 18 is mounted in bore 26, being preferably pressed therein.

The counterbore 24 is provided to prevent engagement between the valve stem 18 and ball valve 16 in a section of the ball valve near the seating plane 25, so that the portion of the ball valve 16 adjacent the seating plane will not be distorted due to strains set up in the ball valve by pressing in of the valve stem 18. The portion of the ball valve into which the valve stem 18 is pressed is preferably near the center of said ball valve where the cross sectional area is greatest, so as to minimize the distortion of the ball valve due to the application of the valve stem.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a valve device, the combination with a ball valve having a recess formed therein, said recess being greater in cross section at the open end than at the closed end within the ball valve, another valve, and a stem carrying said other valve and secured in said ball valve in a portion of the recess adjacent the closed end of said recess.

2. In a valve device, the combination with a valve seat, a ball valve engaging said seat and having a cavity therein extending through the plane of engagement with said valve seat, said ball valve having a recess of smaller cross section than said cavity and opening into said cavity, another valve, and a stem carrying said other valve and secured in said recess.

3. In a valve device, the combination with a valve seat, a ball valve engaging said seat and having a counterbore extending beyond the plane of engagement with said valve seat, said ball valve having a bore opening into the bottom of said counterbore, another valve, and a member carrying said other valve and pressed into said bore.

CLYDE C. FARMER.